United States Patent [19]
Hamahara et al.

[11] Patent Number: 5,997,714
[45] Date of Patent: Dec. 7, 1999

[54] ORGANIC COATED MATERIAL HAVING AN ELECTROLYTICALLY POLYMERIZED COATING FILM CONTAINING CHROMIUM AND METHOD

[75] Inventors: Kyoko Hamahara; Hisatada Nakakoji; Tomokatsu Katagiri; Shuichi Asahina; Kazuo Mochizuki, all of Chiba, Japan

[73] Assignee: Kawasaki Steel Corporation, Japan

[21] Appl. No.: 08/739,943

[22] Filed: Oct. 30, 1996

[30] Foreign Application Priority Data

Oct. 31, 1995 [JP] Japan ................................ 7-284124

[51] Int. Cl.$^6$ .............................. C25D 3/04; C25D 11/00; C25D 11/38; C25D 9/00
[52] U.S. Cl. ......................... 205/290; 205/284; 205/317; 205/319; 205/320; 427/487; 427/409
[58] Field of Search ..................................... 428/684, 659, 428/461, 463, 460, 626; 427/487, 409; 148/264, 274; 205/414, 419, 290, 284, 317, 319, 320

[56] References Cited

U.S. PATENT DOCUMENTS

| | | | |
|---|---|---|---|
| 2,902,390 | 9/1959 | Bell | 117/132 |
| 3,053,692 | 1/1962 | Pocock | 117/75 |
| 4,030,945 | 6/1977 | Hall et al. | 148/6.2 |
| 4,137,368 | 1/1979 | Miller | 428/461 |
| 4,637,840 | 1/1987 | Fujii et al. | 148/6.2 |
| 4,775,600 | 10/1988 | Adaniya et al. | 428/623 |
| 5,023,146 | 6/1991 | Saito et al. | 428/623 |
| 5,231,523 | 7/1993 | Nakaya et al. | 359/56 |

FOREIGN PATENT DOCUMENTS

| | | |
|---|---|---|
| 0 342 585 | 11/1989 | European Pat. Off. . |
| 0531575A1 | 3/1993 | European Pat. Off. . |
| 2698380 | 5/1994 | France . |
| 4-062150 | 2/1992 | Japan . |

OTHER PUBLICATIONS

Chemical Abstracts, vol. 106, No. 14, Apr. 6, 1987, abstract No. 109871, Takakubom, M. "Electrochemical polymerization of pyrrole in aqueous solutions".

*Primary Examiner*—Paul Thibodeau
*Assistant Examiner*—Holly C Rickman
*Attorney, Agent, or Firm*—Austin R. Miller

[57] ABSTRACT

The invention provides a material coated with an organic film which exhibits excellent corrosion resistance and lacquer adhesion. The invention includes an electroconductive substrate coated with an electrolytically polymerized coating film containing chromium. Particularly, a zinc-type plated steel sheet coated with an electrolytically polymerized coating film containing chromium in accordance with the invention is well suited for application in vehicle bodies. The invention further provides a method of making a material coated with an organic film which involves forming organic coating material containing chromium on an electroconductive substrate acting as an electrode by electrolytically polymerizing an organic monomer in an electrolyte solution containing chromium. The method provides a monolithic composite structure comprising chromium compounds and an organic coating film, and avoid the problems associated with passivation after chromium plating of steel. The method of the invention can also reduce processing by two-thirds in relation to conventional methods.

6 Claims, No Drawings

ORGANIC COATED MATERIAL HAVING AN ELECTROLYTICALLY POLYMERIZED COATING FILM CONTAINING CHROMIUM AND METHOD

BACKGROUND OF THE INVENTION

1. Field of the Invention

The present invention relates to organic coated materials having excellent corrosion resistance and lacquer adhesion, and methods of economically making the same. In particular, the present invention relates to electroconductive substrate with an electrolytically polymerized coating film containing chromium formed thereon, and a method of making the same. More particularly, the present invention relates to steel or zinc-type plated steel substrate, suitable for vehicle bodies, having an electrolytically polymerized coating film containing chromium, and relates to a method of making the same.

2. Description of the Related Art

Application of various surface-treated steel sheets to vehicle bodies are increasing every year in response to the demand for high corrosion resistance. A zinc-type plated steel sheet is a typical example of a surface treated steel sheet.

However, steel sheets for vehicle bodies require more corrosion resistance at concealed and hemming portions at the inner sections of the body which are exposed to high humidity, because coating after body assembly is not always sufficient at such portions.

In response to such demand, organic composite coated steel sheets, of which a chromate layer and an organic polymer resin layer containing silica and having a thickness of several $\mu$m or less are coated on a zinc-type-plated steel sheets, have been proposed, as disclosed in Japanese Unexamined Patent Publication Nos. 91-130,141 and 90-258,335, for example. Such organic composite coated steel sheets are widely used for the interior of the body, because these exhibit excellent corrosion resistance even through non-coated after body assembly.

Cost reduction has been continuously required in the vehicle industries. Since the organic composite coated steel sheets are made with use of a chromate layer coating step and an organic layer coating step after plating, each step needs a coater station and an oven for baking, resulting in increased facility costs and operation costs. Further, mechanical properties of organic composite coated steel sheets may worsen after baking.

Electrodeposition and electrolytic polymerization can provide an organic coating film on a steel sheet which does not pass through coating steps using coaters.

In electrodeposition, a polymer and a pigment are migrated to and deposited on a steel sheet under high voltage in an aqueous electrodeposition solution or dispersion containing a polymer (or resin) and a pigment. The uniformity of the film coated by the electrodeposition is inferior to that obtained by using a coater. Thus, a uniform thin film having a thickness of several $\mu$m can be barely deposited on the steel sheet. Further, the use of high voltage power and an inevitable baking step after electrodeposition causes high production costs.

In electrolytic polymerization as an alternative coating method, a monomer is electrolytically polymerized to form an organic coating film on a substrate. The polymerization can be carried out under relatively low voltage. Electrolytic polymerization has been applied to electronic materials, such as capacitors, as disclosed in Japanese Examined Patent Publication Nos. 91-65,008, 91-61,314, and 92-7,521, in which the coated film primarily requires electroconductivity, and thus none of these references refer to achievement of corrosion resistance of the coated substrate.

Surface treatment for directly depositing an electrolytic polymer film on a metallic substrate is disclosed in Japanese Examined Patent Publication No. 75-15,485 and Japanese Unexamined Patent Publication No. 80-16,075, in which only an electrolytically polymerized coating film is formed on an aluminum or iron sheet, and no chromium layer is deposited. Therefore, the sheet after coating exhibits insufficient corrosion resistance at poor adhesion portions in electrodeposition performed after the electrolytic polymerization. When forming a thicker coating film, spot weldability of steel sheets deteriorates to an impractical level for use in vehicles.

SUMMARY OF THE INVENTION

It is an object of the present invention to provide an organic coated material exhibiting excellent corrosion resistance and lacquer adhesion, and particularly, an organic coated steel sheet suitable for vehicle bodies.

It is another object of the present invention to provide a method of making the same at a reduced cost using simplified facilities.

An organic coated material in accordance with a first aspect of the present invention comprises an electroconductive substrate having a monolithic electrolytically polymerized coating film containing chromium thereon.

The electroconductive substrate may be a metallic substrate, a steel substrate, a zinc-based plated steel substrate, or a steel substrate plated with a zinc-based metal in an amount of about 10 to 90 g/m$^2$, for example.

The electrolytically polymerized coating film may be coated in an amount of about 0.01 to 3 g/m$^2$ and may further contain about 10 to 1,000 mg/m$^2$ of chromium.

The electrolytically polymerized coating film may be obtained by electrolytic polymerization of at least one monomer selected from the group consisting of unsaturated aliphatic compounds, pyrrole, thiophene, azulene, phenol, aniline, and their derivatives.

The electrolytically polymerized coating film may be obtained by cathodic polymerization of at least one monomer selected from the group consisting of unsaturated aliphatic compounds and their derivatives.

The electrolytically polymerized coating film may be obtained by anodic polymerization of at least one monomer selected from the group consisting of pyrrole, thiophene, azulene, phenol, aniline, and their derivatives.

One method of making an organic coated material in accordance with the present invention is characterized in that an organic coated material containing chromium is formed on an electroconductive substrate as an electrode by electrolytically polymerizing an organic monomer in an electrolyte solution containing chromium.

The electroconductive substrate may be a metallic substrate, or a steel substrate, or a zinc-based plated steel substrate, or a steel substrate plated with a zinc-based metal in an amount of about 10 to 90 g/m$^2$.

The electrolyte solution may contain about 0.005 to 1 gram atom/liter of chromium express as hexavalent chromium.

The coating of the electrolytically polymerized coating film may be controlled to be about 0.01 to 3 g/m$^2$ and the chromium content in the coating film may be controlled to be about 10 to 1,000 mg/m$^2$ of chromium.

At least one monomer selected from the group consisting of unsaturated aliphatic compounds, and their derivatives may be subjected to cathodic polymerization by using the electroconductive substrate as a cathode.

At least one monomer selected from the group consisting of pyrrole, thiophene, azulene, phenol, aniline, and their derivatives may be subjected to anodic polymerization by using the electroconductive substrate as an anode.

In accordance with the present invention, an organic coated material exhibiting excellent corrosion resistance and lacquer adhesion can be obtained. Further, an organic coated steel sheet exhibiting excellent spot weldability suitable for vehicle bodies can be readily obtained, resulting in vehicle bodies having improved durability.

Further, the organic coated material can be economically produced using simplified facilities, resulting in lower production costs and conservation of global resources.

DESCRIPTION OF THE PREFERRED EMBODIMENTS

Investigations were conducted on steel sheets for vehicles having excellent corrosion resistance and lacquer adhesion and satisfying economic conditions set forth above, in which the surface of the steel was plated with a zinc-based alloy and an organic thin film deposited thereon by cathodic polymerization.

We have already discovered that the formation of a chromium plating layer between a zinc-type plating layer and an electrolytically polymerized coating film remarkably improves corrosion resistance. This surprising result suggests that a chromium plating layer is particularly useful as an interlayer between the zinc-type plating layer and electrolytically polymerized coating film to improve corrosion resistance and to reduce the amount of zinc plating.

However, it was also surprisingly discovered that passivation occurs after chromium plating due to hydrated chromium oxide. Thus, a desirable amount of organic coating film is not deposited by cathodic polymerization unless an activation process is provided to dissolve hydrated chromium oxide.

Further, a surface treated steel sheet as a substitute for conventional organic composite coated steel sheets comprising a chromate layer and a organic coating film and a method of economically making the same has been studied. However, a dissolution step for passivated chromium is also required, resulting in increased processing and facility costs and greater loss of chromium.

Further investigations on a surface treated steel sheet that can withstand severe corrosion conditions and exhibits excellent lacquer adhesion, including a method of making the same using a simplified process or simplified facilities.

We have now discovered that a monolithic composite structure comprising chromium and an organic coating film can prevent passivation of chromium after plating, and that such coating processes can be reduced in extent by two-thirds compared to those for a two-layer structure comprising a chromium plating layer and an organic coating film.

When a monolithic composite structure of electrolytically polymerized coating film containing chromium has the same chromium content and the same amount of organic coating film per unit area of the steel sheet as those of a two-layer structure comprising a chromium layer and an organic coating film, the monolithic composite structure exhibits excellent corrosion resistance and lacquer adhesion which are the same as or better than the two-layer structure.

Further, intensive investigations have been conducted regarding the application of the findings as set forth above to steels for structural purposes, such as H-shaped beams, steel sheet piles; and metallic or electroconductive materials such as steel tubes, aluminum plates, titanium plates, and alloy plates.

Additionally, anodic polymerization, as well as cathodic polymerization, has been investigated as an electrolytic polymerization method.

Any substrates having electroconductivity at least on their surfaces (hereinafter electroconductive substrates) can be used without limitation as a substrate of an organic coated material in accordance with the present invention. Such electroconductive substrates can have an organic coating film containing chromium formed thereon by electrolytic polymerization.

Examples of electroconductive substrates include metallic substrates, such as iron, steel, aluminum, and titanium; graphite; conductive plastics; and substrates in which the surface is treated or coated with conductive materials.

The shape of the electroconductive substrates is not limited, so long as the materials can be energized as a cathode or anode in the electrolytic process. Examples of acceptable shapes include plates, blocks, rods, tubes, bulbs or the like. The electroconductive substrate may have conductivity over its entire surface or a part of the substrate surface. In other words, the surface to be subjected to electrolytic polymerization may be determined by masking or other methods according to the use. Particularly, in plate substrates, the electrolytically polymerized coating film can be deposited on one side or both sides of the plate, or on all or a part of these sides. In tubular substrates, the inside face, as well as the outside face, can be subjected to electrolytic polymerization.

Preferred electroconductive substrates include, for example, steel sheets and aluminum sheets for use in vehicles. Examples of steel sheets include steel sheets of plain steel, alloy steel, and special steel. Preferably, plain steel and low alloy steel is used for improvement in corrosion resistance.

The steel sheets are preferably plated with a zinc-based metal or alloy for further improvement in corrosion resistance. The zinc-type plating layer provides sacrificial corrosion resistance to the steel sheet due to zinc, and chromium in the polymer coating film can reduce the corrosion of zinc. Further, the polymer coating film itself can reduce the elution of zinc corrosion products. As a result, the combination of the zinc-type plating layer and the polymerized coating film containing chromium can achieve significantly improved corrosion resistance over prior art sheets.

Examples of zinc-based plating (or zinc-type plating) in accordance with the present invention include all types of platings containing zinc, such as pure zinc plating, zinc-based alloy plating, and zinc-based composite dispersion plating. More specifically, such zinc-based plating includes, for example, pure zinc plating; binary zinc-based alloy plating, such as zinc-nickel alloy plating, zinc-iron alloy plating, zinc-chromium alloy plating, and zinc-cobalt alloy plating; tertiary zinc-based alloy plating, such as zinc-nickel-chromium alloy plating and zinc-cobalt-chromium alloy plating; and zinc-based composite dispersion plating, such as zinc-SiO$_2$ plating and zinc-cobalt-chromium-Al$_2$O$_3$ plating.

Zinc-based composite dispersion plating represents composite plating in which oxide particles, such as silica and aluminum, are dispersively deposited together with zinc plating or zinc-based alloy plating.

The coverage of zinc-based plating on one side of the steel sheet is preferably about 10 to 90 g/m², and more preferably about 10 to 40 g/m², for use in organic coated steel sheets for vehicles, although the amount of coverage is also affected by intended usage and the thickness of the electrolytically polymerized coating film to be subsequently deposited.

The zinc-type plating layer in accordance with the present invention may contain other elements, such as Cu, Sn, As, and Pb within the scope of the invention.

The zinc-type plating layer can be formed by a conventional plating method, e.g. electroplating, hot dipping, alloyed hot dipping, or vapor phase plating.

The present invention provides an organic coated material and a method of making the same in which the organic coating film containing chromium is formed on the surface of an electroconductive substrate set forth above acting as an electrode by electrolytic polymerization of an organic monomer in an electrolyte solution containing chromium.

The electrolytically polymerized coating film containing chromium can be readily formed on the surface of the electroconductive substrate, and exhibits excellent corrosion resistance through the combination of the barrier effect of the organic coating film and the protection effect of chromium. When a zinc-based plating is formed on the surface of the electroconductive substrate, the corrosion resistance is further improved by the electrochemical protection of the electroconductive underlayer provided by zinc and by retention and restoration effects of zinc corrosion products provided by chromium in the coating film, as set forth above.

The electrolytically polymerized coating film in accordance with the present invention is preferably obtained by electrolytic polymerization of at least one monomer selected from the group consisting of unsaturated aliphatic compounds, pyrrole, thiophene, azulene, phenol, aniline, and their derivatives in an electrolyte solution containing chromium. The electrolytic polymer in the coating film may be a homopolymer or a copolymer.

Although either cathodic polymerization or anodic polymerization can be employed in the electrolytic polymerization, cathodic polymerization is preferable to anodic polymerization because chromium is physically incorporated into the organic coating film in anodic polymerization, whereas electrolytic polymerization and chromium deposition simultaneously occur in cathodic polymerization.

The inclusion of chromium in the electrolytically polymerized coating film can be determined by glow discharge spectrometry.

Examples of monomers suitable for cathodic polymerization include vinyl monomers, such as vinylpyridine, acrylic acid, methacrylic acid, acrylic acid esters, methacrylic acid esters, acrylonitrile, styrene, crotonic acid, acrolein, sodium styrenesulfonate; acetonitrile; and their derivatives. Thus, the organic coating film is preferably formed by cathodic polymerization of at least one monomer selected from the group consisting of such unsaturated aliphatic compounds.

Preferred examples of monomers for anodic polymerization include pyrrole, thiophene, azulene, phenol, aniline, and their derivatives. Thus, the organic coating film is preferably formed by anodic polymerization of at least one monomer selected from such compounds.

In the method of making the organic coating film in accordance with the present invention, the electrolyte solution preferably contains about 0.005 to 1 gram atom/liter of chromium, based upon hexavalent chromium. A gram atom is the molecular weight in grams.

Examples of preferred chromium compounds added to the electrolyte solution include hexavalent chromium compound, such as chromium trioxide, potassium chromate, sodium chromate, ammonium dichromate, sodium dichromate and potassium dichromate. Although trivalent chromium compounds are easily gelated depending on the pH of the electrolyte solution, these may be partially oxidized to hexavalent chromium compounds in the solution. Thus, both chromium compounds can be used in consideration of such equilibrium reactions.

The preferred chromium content per unit area of the electrolytically polymerized coating film in accordance with the present invention ranges from about 10 to 1,000 mg/m². The amount of the organic coating film per unit area deposited on the electroconductive substrate by electrolytic polymerization preferably ranges from about 0.01 to 3 g/m² and more preferably about 0.1 to 3 g/m².

In the ranges set forth above, spot weldability and electrodeposition characteristics are improved with corrosion resistance and lacquer adhesion. In particular, such ranges are essential when the organic coated steel sheet in accordance with the present invention is used in vehicular applications. Although a greater amount of the organic coating film improves corrosion resistance, it also increases production costs and inhibits spot weldability. An excessive chromium content also greatly increases production costs in relation to the corrosion resistance gained. Thus, preferred ranges are dictated by the use of the coated material in accordance with the present invention.

In the present invention, the quantities of electrolytically polymerized coating film deposited on the substrate in accordance with the invention are in reference to the organic film only, and do not include the chromium content.

The form of chromium in the electrolytically polymerized coating film in accordance with the present invention is not limited. Chromium may be incorporated into the organic coating film in the form of zero-valent chromium (metallic chromium), trivalent chromium compounds, or hexavalent chromium compounds depending on electrolytic conditions. Chromium inhibits corrosion by changing its valency. Particularly, in electroconductive substrates of zinc-type plated steel sheets, corrosion can be significantly reduced by the interaction between the chromium inclusions and zinc ions.

It is thought that chromium deposited on the cathode during cathodic polymerization is mainly present as $Cr(OH)_3$, $Cr_2O_3$, and metallic chromium formed by the reduction of chromium ions.

In anodic polymerization, it is assumed that chromium in the aqueous solution migrates to the anode as mainly $Cr^{6+}$, e.g. $Cr_2O_7^{2-}$ and $CrO_4^{2-}$ and is deposited on the electrode in that form.

Preferred electrolytes and solvents in electrolytic solutions used for cathodic polymerization and anodic polymerization in accordance with the present invention will be described.

Preferred electrolytes for cathodic polymerization include oxidizing agents, such as peroxides, perchlorates e.g. alkaline salts of perchloric acid, and peroxisosulfates. These oxidizing agents act as polymerization catalysts for vinyl monomers, and at least one oxidizing agent is used. The electrolyte is not always essential for polymerization because the hexavalent chromium compounds set forth above also act as oxidizing agents.

A preferred solvent for cathodic polymerization is water, and any non-aqueous solvent miscible with water can be used concurrently to enhance the solubility of the monomer. Examples of such solvents include alcohols, e.g. methanol and ethanol; cellosolves, e.g. methyl cellosolve, ethyl cellosolve, and butyl cellosolve; aprotic polar solvents, e.g. dimethyl sulfoxide (DMSO), dimethylformamide (DMF), dimethylacetamide (DMAc), hexamethylphosphoramide (HMPA), N-methylpyrrolidone (NMP), and acetonitrile; and tetrahydrofran (THF). These solvents can be used alone or in combination. Some of these solvents also can be used without water.

Preferred electrolytes in electrolytic solutions for anodic polymerization include sodium oxalate, potassium oxalate, sodium hydroxide, and potassium hydroxide. These electrolytes can be used alone or in combination. Preferred solvents for anodic polymerization include water and mixtures of water and organic solvents as described above in relation to cathodic polymerization.

EXAMPLES

The present invention will now be described through illustrative examples. The examples are not intended to limit the scope of the appended claims.

Experiment A

A low carbon steel sheet having a thickness of 0.75 mm was degreased, washed with an acid, and subjected to electroplating with a Zn—Ni alloy containing 12 percent by weight of nickel so that the plating per unit area of one side of the steel sheet was 20 $g/m^2$. A organic coating film containing chromium was formed on the plated steel sheet by electrolytic polymerization in an electrolyte solution containing a chromium compound and monomer under conditions set forth in Table 1. A series of organic coated steel sheets, Examples 1 through 11 and Comparative Examples 1 through 5, were prepared in the manner set forth above.

TABLE 1

| | Electrode of which Zn—Ni alloy plated steel sheet is used. | Monomer | Composition of electrolyte solution | | | Organic coated film | |
|---|---|---|---|---|---|---|---|
| | | | Chromium compound ($Cr^{6+}$ amount: gram atom/l) | Electrolyte | Solvent | Coated amount* ($g/m^2$) | Chromium content ($mg/m^2$) |
| Example 1 | Cathode | Acrylic acid | $CrO_3$ (0.05) | Ammonium perchlorate | water | 0.5 | 140 |
| Example 2 | Cathode | Methyl-methacrylate | $CrO_3$ (0.5) | Potassium perchlorate | Acetonitrile | 0.2 | 400 |
| Example 3 | Cathode | Acrylic acid | $Na_2Cr_2O_7$ (0.2) | Ammonium peroxo disulfate | water | 0.3 | 70 |
| Example 4 | Cathode | 2-Vinylpyridine | $CrO_3$ (0.05) | none | water | 1 | 210 |
| Example 5 | Cathode | 2-Vinylpyridine | $CrO_3$ (0.05) | Ammonium perchlorate | water (90%) + methanol (10%) | 0.8 | 100 |
| Example 6 | Cathode | Acrylic acid + Methacrylic acid | $CrO_3$ (0.2) | none | water (60%) + methanol (40%) | 0.8 | 420 |
| Example 7 | Cathode | Methyl acrylate + Styrene | $CrO_3$ (0.2) | Ammonium peroxo disulfate | water (30%) + Ethyl cellsolve (70%) | 0.2 | 180 |
| Example 8 | Anode | Phenol | $CrO_3$ (0.05) | Potassium hydroxide | water | 0.5 | 10 |
| Example 9 | Anode | Pyrrole | $CrO_3$ (0.5) | Sodium oxalate | water | 0.2 | 15 |
| Example 10 | Anode | Pyrrole | $Na_2Cr_2O_7$ (0.2) | Potassium hydroxide | water | 0.3 | 15 |
| Example 11 | Cathode | 2-Vinylpyridine | $CrO_2$ (1.3) | Ammonium perchlorate | water (90%) + methanol (10%) | 0.03 | 1200 |
| Comparative Example 1 | Anode | Phenol | none | Potassium hydroxide | water | 0.8 | 0 |
| Comparative Example 2 | Cathode | 2-Vinylpyridine | none | Ammonium perchlorate | water (90%) + methanol (10%) | 0.8 | 0 |
| Comparative Example 3 | Cathode | 2-Vinylpyridine | none | Ammonium perchlorate | water (90%) + methanol (10%) | 0.2 | 0 |
| Comparative Example 4 | — | Coated by a coater | — | — | — | 0.8** | 0 |
| Comparative Example 5 | — | — | — | — | — | 0 | 0 |

Electrolytic Polymerization Conditions:
Electrolyte solution temperature: 40° C.,
Current density: 5–50 $A/dm^2$
Electrolysis time: 0.1–5 sec.
*Deposited amount on one side of a Zn—Ni alloy type plated steel sheet.
**An Epoxy resin was coated by a coater.

Each of the resulting organic coated steel sheets was subjected to various tests to evaluate corrosion resistance, lacquer adhesion, spot weldability and other characteristics as set forth below.

As Comparative Examples, the following four steel sheets (a) through (d) were subjected to the same tests:

(a) Two organic coated steel sheets (Comparative Examples 1 and 2). Each organic coated steel sheet was prepared from the Zn—Ni alloy electroplated steel sheet set forth above by electrolytic polymerization in an electrolyte solution not containing a chromium compound under the conditions set forth in Table 1.

(b) An organic coated steel sheet (Comparative Example 3), prepared from the Zn—Ni alloy electroplated steel sheet, which is further plated with chromium in an amount of 100 mg/m², by cathodic polymerization in an electrolyte solution not containing a chromium compound under the conditions set forth in Table 1.

(c) A surface treated steel sheet (Comparative Example 4), prepared from the Zn—Ni alloy electroplated steel sheet, on which a chromate film was deposited with a coater in an amount of 50 mg/m² in terms of chromium and an epoxy resin is coated thereon with a coater.

(d) The untreated Zn—Ni alloy electroplated steel sheet (Comparative Example 5), which was not subjected to electrolytic polymerization.

In Examples 6 and 7, a copolymer coating film was deposited by cathodic polymerization in an electrolyte solution containing two kinds of monomers.

The composition of the electrolyte solution, the amount of organic coating film deposited on the steel sheet, and the chromium content in the organic coating film of each sample are summarized in Table 1. Results of various evaluation tests performed on each sample are shown in Table 2.

TABLE 2

| | Salt spray test (hr) | Lacquer Adhesion | Spot Weld-ability | Cost evaluation | |
|---|---|---|---|---|---|
| | | | | Facilities | Operation |
| Example 1 | 1300 | ○ | ◎ | ◎ | ◎ |
| Example 2 | 1800 | ○ | ◎ | ◎ | ◎ |
| Example 3 | 1200 | ○ | ◎ | ◎ | ◎ |
| Example 4 | 1500 | ○ | ◎ | ◎ | ◎ |
| Example 5 | 1250 | ○ | ◎ | ◎ | ◎ |
| Example 6 | 1600 | ○ | ◎ | ◎ | ◎ |
| Example 7 | 1250 | ○ | ◎ | ◎ | ◎ |
| Example 8 | 1000 | ○ | ◎ | ◎ | ◎ |
| Example 9 | 950 | ○ | ◎ | ◎ | ◎ |
| Example 10 | 950 | ○ | ◎ | ◎ | ◎ |
| Example 11 | 2100 | ○ | x | ◎ | ◎ |
| Comparative Ex. 1* | 600 | ○ | ◎ | ◎ | ◎ |
| Comparative Ex. 2 | 600 | ○ | ◎ | ◎ | ◎ |
| Comparative Ex. 3 | 1100 | ○ | ◎ | Δ | Δ |
| Comparative Ex. 4 | 1300 | ○ | ◎ | x | x |
| Comparative Ex. 5 | 300 | — | ◎ | ◎ | ◎ |

*Comparative Ex. 1* means Comparative Example 1.

The amount of the plated alloy in Zn—Ni alloy electroplating and the Ni content in the plating were determined by counting the number of characteristic Zn and Ni peaks in a fluorescence X-ray analysis.

Test methods and standards for evaluation of the various tests are as follows:

The Chromium Content in the Organic Coating Film

Determined by counting the number of characteristic Cr peaks in a fluorescence X-ray analysis.

The Amount of the Organic Coating Film Deposited on the Steel Sheet

This was determined by counting the number of characteristic C peaks in fluorescence X-ray analysis.

Salt Spray Test

The salt spray test was carried out based on JIS Z2371, in which a 5% sodium chloride solution was sprayed on the sample in a 35° C. thermostatic chamber, and the formation of red rust was observed. The number in the salt spray test represents the time in hours required until the red rust formed over an area constituting 5% of the steel sheet.

Lacquer Adhesion Test

After a 20 μm thick coating was applied to the sample surface by electrodeposition, the sample was subjected to the DuPont impact test described below. Coating stripped was observed when an adhesive tape adhered to the sample surface was peeled off, and adhesiveness was evaluated based on the following standard:

○: Stripping was not found x: Stripping was found

The DuPont impact test: A 1 kg weight was dropped from 50 cm hight to the back face of the sample using an impactor having a diameter of ¼ inches.

Spot Weldability

For evaluating spot weldability, the sample was subjected to continuous welding using a welding chip made of an $Al_2O_3$-dispersed copper alloy and having a 6 mmφ tip at a pressure of 200 kgf, a welding current of 9 kA, and a welding time of 10 cycles (50 Hz). The continuous welding was repeated until the nugget diameter was smaller than the specified diameter and the weldability was evaluated by the number of welding cycles as follows:

◎: 3,000 or more

○: 2,000 or more and less than 3,000

Δ: 1,000 or more and less than 2,000 x: less than 1,000

Cost Evaluation (i) On Facilities

The feasibility of production was evaluated by using a standby reservoir and a postprocessing unit of conventional zinc-based plating facilities, and the evaluation was based on the following standard:

○: Producible with three or less plating reservoirs when electrolysis was performed at the same line speed as the zinc-based plating (basically, no additional facilities were required).

Δ: Four or more plating reservoirs were required when electrolysis was performed at the same line speed as the zinc-based plating (a small scale extension was required).

x: New facilities were required.

(ii) On Operation

◎: Continuously producible by conventional zinc-based plating facilities without additional control items.

Δ: Continuously producible by conventional zinc-based plating facilities with additional control items.

x: The steel sheet must be coiled up after conventional zinc-based plating, and be transferred to other facilities for the treatment.

In Tables 1 and 2, Examples 1 through 11 are within the scope of the present invention. In particular, in Examples 1 through 10, organic coating films exhibiting excellent corrosion resistance, lacquer adhesion, and spot weldability were economically produced by using simplified facilities comprising an electrolysis reservoir, i.e., one process. Example 11, a organic coating film exhibiting excellent corrosion resistance and lacquer adhesion with a slight decrease in spot weldability, was economically produced by using simplified facilities comprising an electrolysis reservoir, i.e., one process.

In Comparative Examples 1 and 2, organic coating films not containing chromium, little improvement in corrosion resistance was observed.

In Comparative Example 3, the chromium plating layer and the electrolytically polymerized coating film require their respective electrolytic cells and washing tanks, resulting in higher facility and operation costs.

In Comparative Example 4, an additional coater and baking facilities are required for forming the epoxy coating film, resulting in a significant increase in production costs.

In Comparative Example 5, the conventional Zn—Ni alloy plated steel sheet not having an organic coating film and a chromium layer exhibited poor corrosion resistance.

Experiment B

A H-shaped beam or an aluminum plate 0.3 mm thick was degreased with an alkaline solution and subjected to electrolytic polymerization to form an organic coating film containing chromium therein, using an electrolyte solution containing a chromium compound and monomer under conditions set forth in Table 3 (Examples 12 through 18 and Comparative Examples 6 through 8).

TABLE 3

| | Electroconductive substrate | | Composition of electrolyte solution | | | | Organic coated film | |
|---|---|---|---|---|---|---|---|---|
| | | | Monomer | Chromium compound ($Cr^{6+}$ amount: gram atom/l) | Electrolyte | Solvent | Coated amount* ($g/m^2$) | Chromium content ($mg/m^2$) |
| | Kind | Electrode | | | | | | |
| Example 12 | H-shaped beam | Cathode | Acrylic acid | $CrO_3$ (0.05) | Ammonium perchlorate | water | 0.5 | 140 |
| Example 13 | H-shaped beam | Cathode | Methylmethacrylate | $CrO_3$ (0.5) | Potassium perchlorate | Acetonitrile | 0.2 | 400 |
| Example 14 | H-shaped beam | Anode | Phenol | $CrO_3$ (0.05) | Potassium hydroxide | water | 0.5 | 10 |
| Example 15 | Aluminum plate | Cathode | Acrylic acid | $Na_2Cr_2O_7$ (0.2) | Ammonium peroxo disulfate | water | 0.3 | 70 |
| Example 16 | Aluminum plate | Cathode | 2-Vinylpyridine | $CrO_3$ (0.05) | none | water | 1 | 210 |
| Example 17 | Aluminum plate | Cathode | 2-Vinylpyridine | $CrO_3$ (0.05) | Ammonium perchlorate | water (90%) + methanol (10%) | 0.8 | 100 |
| Example 18 | Aluminum plate | Anode | Pyrrole | $CrO_3$ (0.5) | Sodium oxalate | water | 0.2 | 15 |
| Comparative Ex. 6 | H-shaped beam | — | — | — | — | — | 0 | 0 |
| Comparative Ex. 7 | Aluminum plate | Cathode | 2-Vinylpyridine | none | Ammonium perchlorate | water (90%) + methanol (10%) | 0.8 | 0 |
| Comparative Ex. 8 | Aluminum plate | — | — | — | — | — | 0 | 0 |

Electrolytic Polymerization Conditions:
Electrolyte solution temperature: 40° C.,
Current density: 5–50 A/$dm^2$,
Electrolysis time: 0.1–5 sec.
*Deposited amount represents per one side for an aluminum plate, or per one face for an H-shaped beam.

Each resulting organic coated sample was subjected to a lacquer adhesion test as set forth below.

The corrosion resistance was evaluated on the H-shaped beam by the formation of red rust through the salt spray test described in Experiment A, and by the method set forth below for the aluminum plate.

As Comparative Examples, the following three substrates (e) through (g) were subjected to the same tests:

(e) The above-mentioned H-steel, not subjected to electrolytic polymerization (Comparative Example 6).

(f) The above-mentioned aluminum plate, not subjected to electrolytic polymerization (Comparative Example 8).

(g) An organic coated material (Comparative Example 7), prepared by electrolytic polymerization on an aluminum plate in an electrolyte solution not containing chromium compounds under the conditions set forth in Table 3.

Test methods and standards for evaluation for the various tests were as follows:

Cross-Cut Adhesion Test

A check pattern was notched using a pitch of 100 checks per 2 mm by 2 mm with a NT cutter. A cellophane tape was then adhered onto the check pattern and peeled off to determine the residual coating film remaining on the test samples. The standard for evaluation was as follows:

○: None of the 100 checks were peeled off
Δ: One to five of the 100 checks were peeled off
x: Six or more of the 100 checks were peeled off Corrosion Resistance Test After each sample was, for one month, immersed in an aqueous salt solution at 50° C. prepared by the addition of 0.1 g of sodium chloride into every 1 liter of tap water supplied in Chiba city, the maximum pitting depth was determined. The standard for evaluation was as follows:

⊚: A maximum pitting depth of less than 0.01 mm
○: A maximum pitting depth of 0.01 mm or more and less than 0.1 mm
Δ: A maximum pitting depth of 0.1 mm or more and less than 0.2 mm
x: A maximum pitting depth of 0.2 mm or more The composition of the electrolyte solution, the amount of organic coating film deposited on the substrate, and the chromium content in the organic coating film of each sample are summarized in Table 3. Results of various evaluation tests on each sample are shown in Table 4.

In Tables 3 and 4, Examples 12 through 18 are within the scope of the present invention. An organic coated material having excellent corrosion resistance and lacquer adhesion (by cross-cut adhesion test) is observed in these Examples. In particular, in Examples 12 through 14, uniform organic coating films were readily formed on non-flat H-shaped beam on which a uniform organic coating film cannot be formed by conventional methods, such as spray coating. Thus, uniform corrosion resistance can be achieved using simplified facilities.

In Comparative Example 6, the H-shaped beam exhibits poor corrosion resistance because it is untreated.

In Comparative Example 8, the untreated aluminum plate exhibits poor pitting corrosion resistance in the presence of chloride ions with several other kinds of ions.

In Comparative Example 7, the electrolytically polymerized coating film not containing chromium exhibits little improvement in corrosion resistance.

TABLE 4

|  | Cross-cut adhesion test | Salt spray test | Pitting corrosion resistance |
|---|---|---|---|
| Example 12 | ○ | 50 | — |
| Example 13 | ○ | 70 | — |
| Example 14 | ○ | 30 | — |
| Example 15 | ○ | — | ⊚ |
| Example 16 | ○ | — | ⊚ |
| Example 17 | ○ | — | ⊚ |
| Example 18 | ○ | — | ○ |
| Comparative Ex. 6* | — | 1 | — |
| Comparative Ex. 7 | ○ | — | Δ |
| Comparative Ex. 8 | — | — | x |

*Comparative Ex. 6* means Comparative Example 6.

Though the invention has been described above in specific detail, it is understood that equivalents may be substituted for various elements of the invention without departing from the spirit and scope of the invention defined in the appended claims.

What is claimed is:

1. A method of making an electroconductive steel substrate plated with zinc, a zinc alloy, or a zinc composite dispersion having formed thereon and secured thereto an organic film, which method comprises electrolytically polymerizing an organic monomer coating film containing chromium or a chromium compound on said electroconductive substrate which is electrically connected as an electrode, electrolytically polymerizing said organic monomer in monomeric electrolyte solution containing chromium in contact with said electroconductive substrate, thereby producing a monolithic composite on said substrate composed of a polymer produced by said electrolytic polymerization with said chromium dispersed therein.

2. A method according to claim 1, wherein said electroconductive substrate is a steel substrate plated with zinc, a zinc alloy, or a zinc composite dispersion in an amount of about 10 to 90 $g/m^2$.

3. A method according to any one of claims 1 or 2, wherein said electroyte solution contains about 0.005 to 1 gram atom/liter of chromium expressed as hexavalent chromium.

4. A method according to claim 3, wherein the area density of said electrolytically polymerized coating film is controlled to about 0.01 to 3 $g/m^2$ and the chromium content in said coating film is controlled to about 10 to 1,000 $mg/m^2$ of chromium.

5. A method according to any one of claims 1 or 2, wherein at least one monomer selected from the group consisting of unsaturated aliphatic compounds and derivatives thereof is subjected to cathodic polymerization by electrically connecting said electroconductive substrate as a cathode.

6. A method according to any one of claims 1 or 2, wherein at least one monomer selected from the group consisting of pyrrole, thiophene, azulene, phenol, aniline, and derivatives thereof is subjected to anodic polymerization by electrically connecting said electroconductive substrate as an anode.

* * * * *